United States Patent
Hirano et al.

(10) Patent No.: US 9,610,979 B2
(45) Date of Patent: Apr. 4, 2017

(54) SUBFRAME STRUCTURE

(71) Applicant: HONDA MOTOR CO., LTD., Minato-ku, Tokyo (JP)

(72) Inventors: Masataka Hirano, Wako (JP); Tetsuya Miyahara, Wako (JP); Masahiro Terada, Wako (JP); Shungo Fueki, Wako (JP); Go Fujikawa, Wako (JP); Gen Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/820,110

(22) Filed: Aug. 6, 2015

(65) Prior Publication Data
US 2016/0039464 A1 Feb. 11, 2016

(30) Foreign Application Priority Data

Aug. 8, 2014 (JP) .................................. 2014-162983
Aug. 20, 2014 (JP) .................................. 2014-167265

(51) Int. Cl.
*B62D 21/11* (2006.01)
*B60K 5/12* (2006.01)

(52) U.S. Cl.
CPC ............ *B62D 21/11* (2013.01); *B60K 5/1208* (2013.01); *B60K 5/1216* (2013.01); *B60K 5/1283* (2013.01)

(58) Field of Classification Search
CPC .............................. B62D 21/11; B62D 25/082
USPC .................................................. 280/124.109
See application file for complete search history.

(56) References Cited

U.S. PATENT DOCUMENTS

| | | | | |
|---|---|---|---|---|
| 3,913,696 A | * | 10/1975 | Kennedy ................... | B60G 7/02 180/292 |
| 5,609,366 A | * | 3/1997 | Kamei .................... | B62D 21/11 280/788 |
| 6,869,090 B2 | * | 3/2005 | Tatsumi ................... | B60G 3/20 280/124.109 |
| 7,213,873 B2 | * | 5/2007 | Murata .................. | B62D 21/11 296/187.09 |
| 7,520,514 B2 | * | 4/2009 | Ogawa ..................... | B60G 3/20 180/312 |

(Continued)

FOREIGN PATENT DOCUMENTS

| | | |
|---|---|---|
| JP | H03-110236 U | 11/1991 |
| JP | 2000159145 A | 6/2000 |

(Continued)

OTHER PUBLICATIONS

Office Action (Notice of Reasons for Rejection) issued in corresponding Japanese Patent Application 2014-167265, dispatched on Dec. 13, 2016, with English translation.

*Primary Examiner* — Faye M Fleming
(74) *Attorney, Agent, or Firm* — Carrier Blackman & Associates, P.C.; Joseph P. Carrier; Fulchand P. Shende

(57) ABSTRACT

A subframe structure being supported by a vehicle-body frame and supporting a vehicular power plant through a damping device. The subframe structure includes: a longitudinal member which extends in a front-rear direction of a vehicle and is rigidly fixed to the vehicle-body frame; a lateral member which extends in a vehicle width direction and on which at least one of the damping devices is mounted; a floating mechanism which floatingly supports the lateral member on the longitudinal member through an elastic mechanism; and a suspension arm connected to the longitudinal member.

2 Claims, 17 Drawing Sheets

(56) References Cited

U.S. PATENT DOCUMENTS

| | | | |
|---|---|---|---|
| 7,584,815 B2* | 9/2009 | Ogawa | B60G 3/20 180/312 |
| 8,523,258 B2* | 9/2013 | Ohhama | B62D 21/11 180/299 |
| 8,540,261 B2* | 9/2013 | Okamoto | B62D 21/11 280/124.109 |
| 8,794,646 B1* | 8/2014 | Onishi | B62D 21/155 280/124.109 |
| 2006/0284449 A1 | 12/2006 | Miyahara | |
| 2007/0024044 A1* | 2/2007 | Ogawa | B60G 3/20 280/788 |
| 2007/0169982 A1* | 7/2007 | Ogawa | B60G 3/20 180/312 |
| 2007/0278778 A1* | 12/2007 | Tanaka | B60G 7/02 280/788 |
| 2011/0062677 A1* | 3/2011 | Kudla | B62D 3/12 280/124.109 |
| 2011/0115258 A1* | 5/2011 | Ohhama | B62D 21/11 296/193.07 |
| 2014/0312655 A1 | 10/2014 | Takahashi et al. | |

FOREIGN PATENT DOCUMENTS

| | | |
|---|---|---|
| JP | 2000-238545 A | 9/2000 |
| JP | 2006051839 A | 2/2006 |
| JP | 2006-347464 A | 12/2006 |
| JP | 2010-269645 A | 12/2010 |
| JP | 2011-106626 A | 6/2011 |
| JP | 2012166739 A | 9/2012 |
| WO | 2013/073499 A1 | 4/2015 |

* cited by examiner

FIG. 10
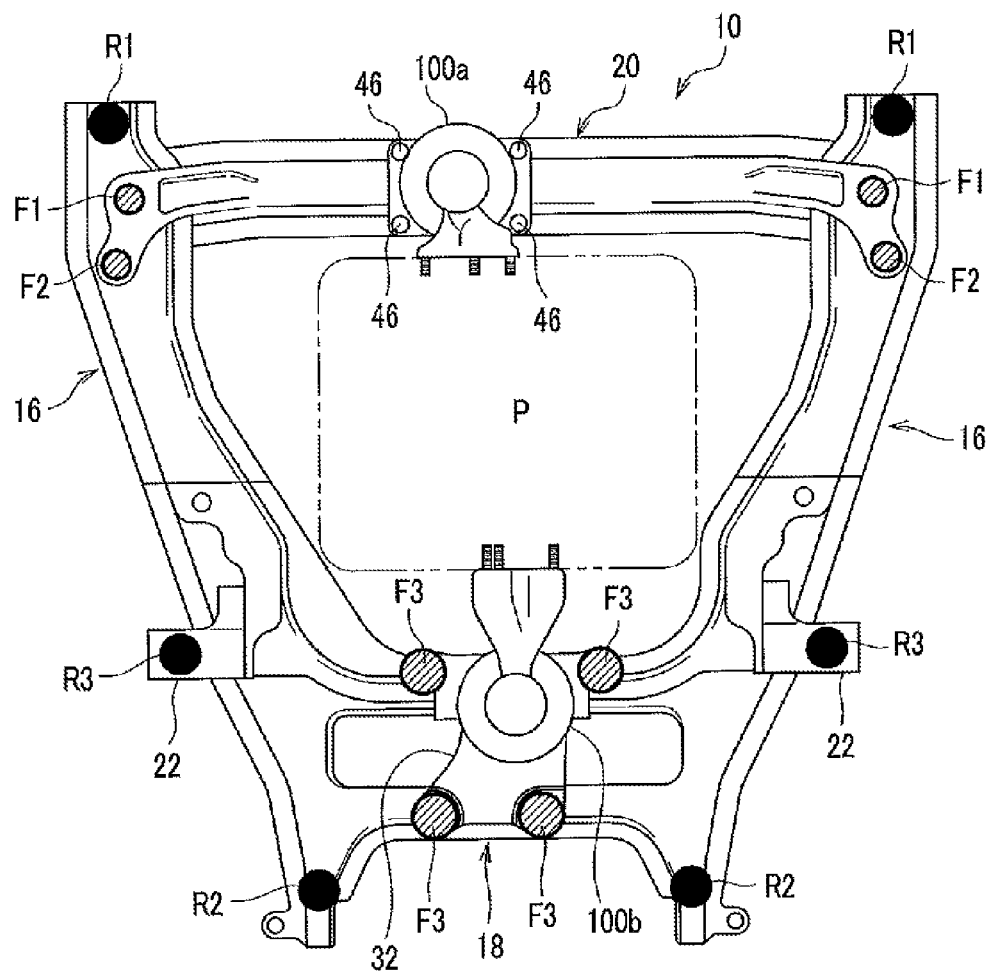
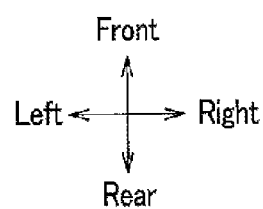

FIG. 13
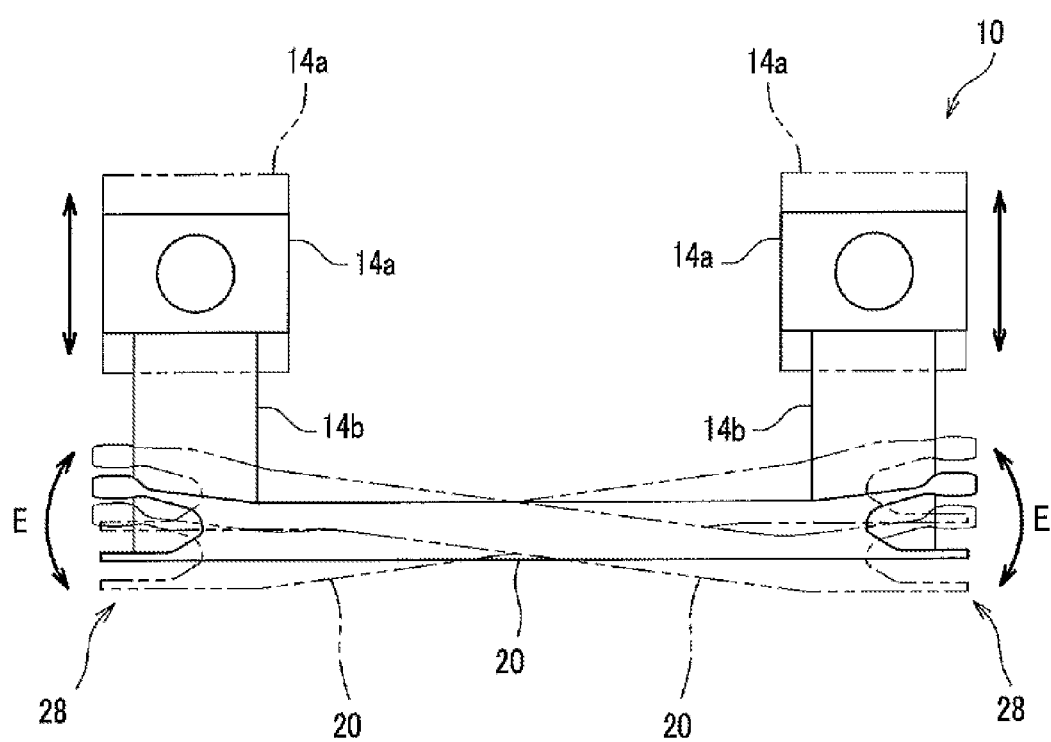
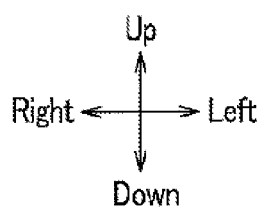

SUBFRAME STRUCTURE

BACKGROUND OF THE INVENTION

Field of the Invention

The present invention relates to a subframe structure in a vehicle.

Description of the Related Art

A subframe is arranged in vehicles such as automobiles. The subframe is fixed to front side frames constituting a vehicle-body frame. For example, suspension components such as suspension arms and a stabilizer are connected to the subframe, and the subframe supports through one or more damping devices a vehicular power plant such as an engine and/or motor.

For example, Patent Literature 1 discloses a vibration-absorbing elastic structure 1 formed of rubber which absorbs vibrations occurring in a vehicle body as illustrated in FIG. 18. The vibration-absorbing elastic structure 1 is constituted by two cylindrical elastic elements 2a and 2b and metallic disks 3a and 3b, where the metallic disks 3a and 3b are respectively inserted under the elastic elements 2a and 2b. In addition, in FIG. 18, the reference numeral 4 denotes right and left brackets, 5 denotes a cross member, and 6 denotes stud bolts for fixing the vibration-absorbing elastic structure 1 to the cross member 5.

Further, a subframe structure which is connected to the undersides of the front side frames through elastic elements and formed with a frame having an approximately rectangular shape in plan view is known as a subframe structure which is to be arranged in the front section of a vehicle (as disclosed, for example, in Patent Literature 2). The frame supports a vehicular power plant such as an engine or a motor, and right and left front suspensions are connected to the frame. In the subframe structure disclosed in Patent Literature 2, the frame is fastened to the vehicle-body frame through the elastic elements, which are arranged on both sides of the frame. In the above subframe structure, the frame is floatingly supported by the vehicle-body frame through the elastic elements. Thus, the power plant is supported by the vehicle-body frame in a vibration-damping manner.

CITATION LIST

Patent Literature

Patent Literature 1: Japanese Patent Laid-open No. 2000-238545
Patent Literature 2: Japanese Patent Laid-Open No. 2011-106626

Technical Problem

In the case where the vibration-absorbing elastic structure 1 disclosed in Patent Literature 1 is arranged in a subframe, for example, transmission of vibrations generated in a vehicular power plant such as an engine can be suppressed. However, it is difficult to reduce the vibrations inputted from the road surface through the suspension arms to the subframe.

In addition, there are demands for enhancing the vibration-damping effect by utilizing the conventional subframe structure without changing the shape of the conventional subframe and the positions at which the subframe is fixed to the vehicle-body frame.

Further, in the subframe structure as disclosed in Patent Literature 2, a single elastic element is arranged at the position at which floating support is provided. Therefore, the size of the elastic element tends to become large in consideration of the vertical resonant frequency for the purposes of the support rigidity of and the vibration isolation from the vehicular power plant with the frame. When the size of the elastic element becomes large, the size of the mount for floating support also becomes large, so that the design freedom decreases. Therefore, there are demands for a subframe structure which can maintain satisfactory performance in attenuating vibrations transmitted from the vehicular power plant to the vehicle-body frame, and downsize the mount for floating support.

SUMMARY OF THE INVENTION

The first object of the present invention is to provide a subframe structure which can reduce vibrations inputted from the road surface, and can further enhance the vibration-damping effect by utilizing the conventional subframe structure. The second object of the present invention is to provide a subframe structure which can maintain satisfactory performance in attenuating vibrations transmitted from the vehicular power plant to the vehicle-body frame, and downsize the mount for floating support.

In order to achieve the first object of the present invention, a first aspect of the present invention provides a subframe structure being supported by a vehicle-body frame and supporting a vehicular power plant through one or more damping devices. The subframe structure according to the first aspect of the present invention is characterized in including: a longitudinal member which extends in a front-rear direction of a vehicle and is rigidly fixed to the vehicle-body frame; a lateral member which extends in a vehicle width direction and on which at least one of the damping devices is mounted; a floating mechanism which floatingly supports the lateral member on the longitudinal member through an elastic mechanism; and a suspension arm connected to the longitudinal member.

According to the first aspect of the present invention, even in the case where the longitudinal member is rigidly fixed to the vehicle-body frame, the vehicular power plant and the lateral member which are floatingly supported by the floating mechanism function as the so-called dynamic damper. Therefore, according to the first aspect of the present invention, the vibrations (the road-surface vibrations) having frequencies near the resonant frequency which are inputted from the suspension arm to the longitudinal member can be reduced by the dynamic damper effect. In addition, since, according to the first aspect of the present invention, the lateral member on which the at least one damping device is mounted is floatingly supported through the elastic mechanism, the subframe structure according to the first aspect of the present invention achieves a vibration-reduction effect which is equivalent to or more than the vibration-reduction effect obtained in the case where the entire subframe is simply floatingly supported on the vehicle-body frame.

Further, according to the first aspect of the present invention, the lateral members may include a front lateral member which is floatingly mounted on a front portion of the longitudinal member through the floating mechanism.

According to the first aspect of the present invention with the above feature, the longitudinal member elastically resonates with the vibrations inputted from the suspension arm, and the front lateral member resonates in opposite phase to the elastic resonant vibration of the longitudinal member.

Therefore, the vibrations (road-surface vibrations) which are inputted from the suspension arms can be further reduced.

In order to achieve the second object of the present invention, a second aspect of the present invention provides a subframe structure being supported by a vehicle-body frame and supporting a vehicular power plant through a damping device. The subframe structure according to the second aspect of the present invention is characterized in including: a longitudinal member which extends in a front-rear direction of a vehicle; a lateral member which extends in a vehicle width direction and on which the damping device is arranged; and a plurality of elastic elements which are arranged side by side along the front-rear direction in the longitudinal member, and through which the lateral member is supported.

According to the second aspect of the present invention, the plurality of elastic elements through which the lateral member is supported by the longitudinal member are separately arranged in the front-rear direction of the vehicle. Therefore, when a vibration load is inputted from the vehicular power plant to the lateral member, elastic centers can be decentralized to the plurality of elastic elements. Thus, according to the second aspect of the present invention, satisfactory performance is maintained in attenuating the vibrations transmitted from the vehicular power plant to the vehicle-body frame, and the mount for floating support can be downsized.

Effect of Invention

According to the first aspect of the present invention, it is possible to obtain a subframe structure which can reduce the vibrations inputted from the road surface, and can further enhance the vibration-damping effect by utilizing the conventional subframe structure. According to the second aspect of the present invention, it is possible to obtain a subframe structure which can maintain satisfactory performance in attenuating the vibrations transmitted from the vehicular power plant to the vehicle-body frame, and downsize the mount for floating support.

BRIEF DESCRIPTION OF THE DRAWINGS

FIG. 10 is a schematic plan view indicating positional relationships between fixing points and floating points on the subframe structure illustrated in FIG. 3.

FIG. 13 is a front view indicating a manner in which a front cross beam rotates in the vehicle-body rolling direction in association with elastic resonant vibrations of right and left front side frames.

DETAILED DESCRIPTION OF THE INVENTION

Figure 1:
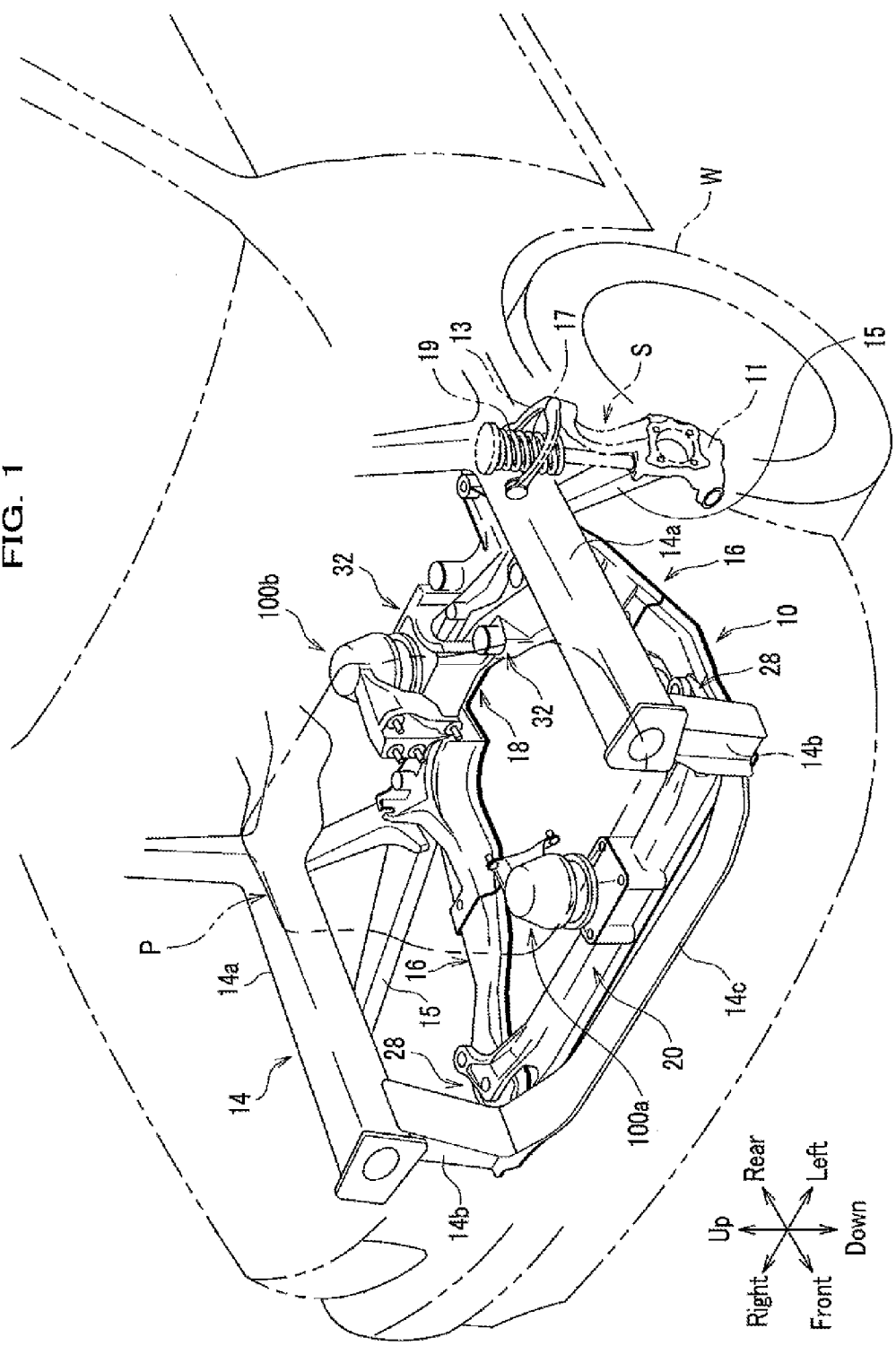
FIG. 1 is a transparent perspective view illustrating an arrangement, in a front section of a vehicle, of a subframe structure according to an embodiment of the present invention.
Figure 2:
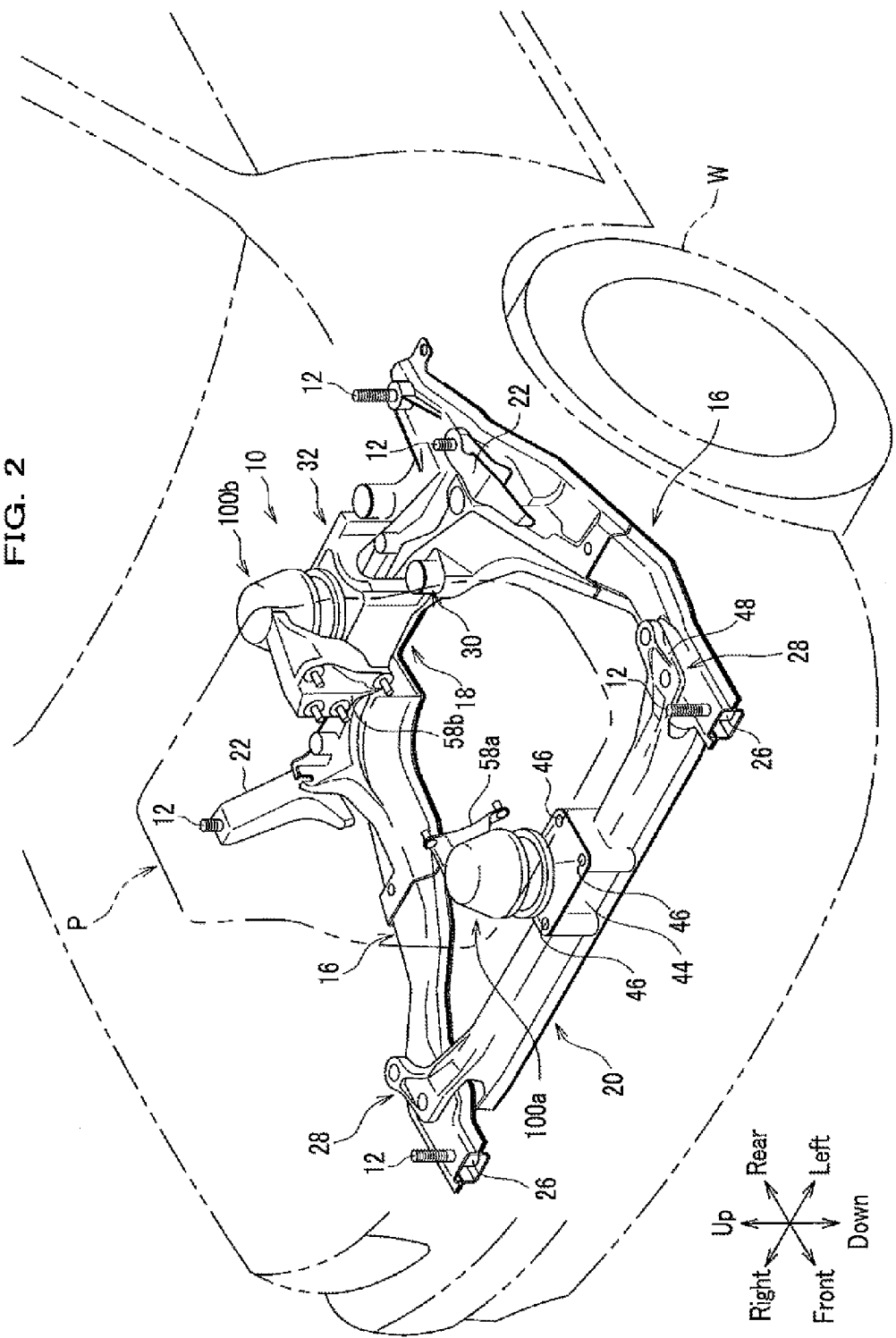
FIG. 2 is a transparent perspective view illustrating the subframe structure, where right and left front side frames and some other elements are removed from the arrangement illustrated in FIG. 1.
Figure 3:
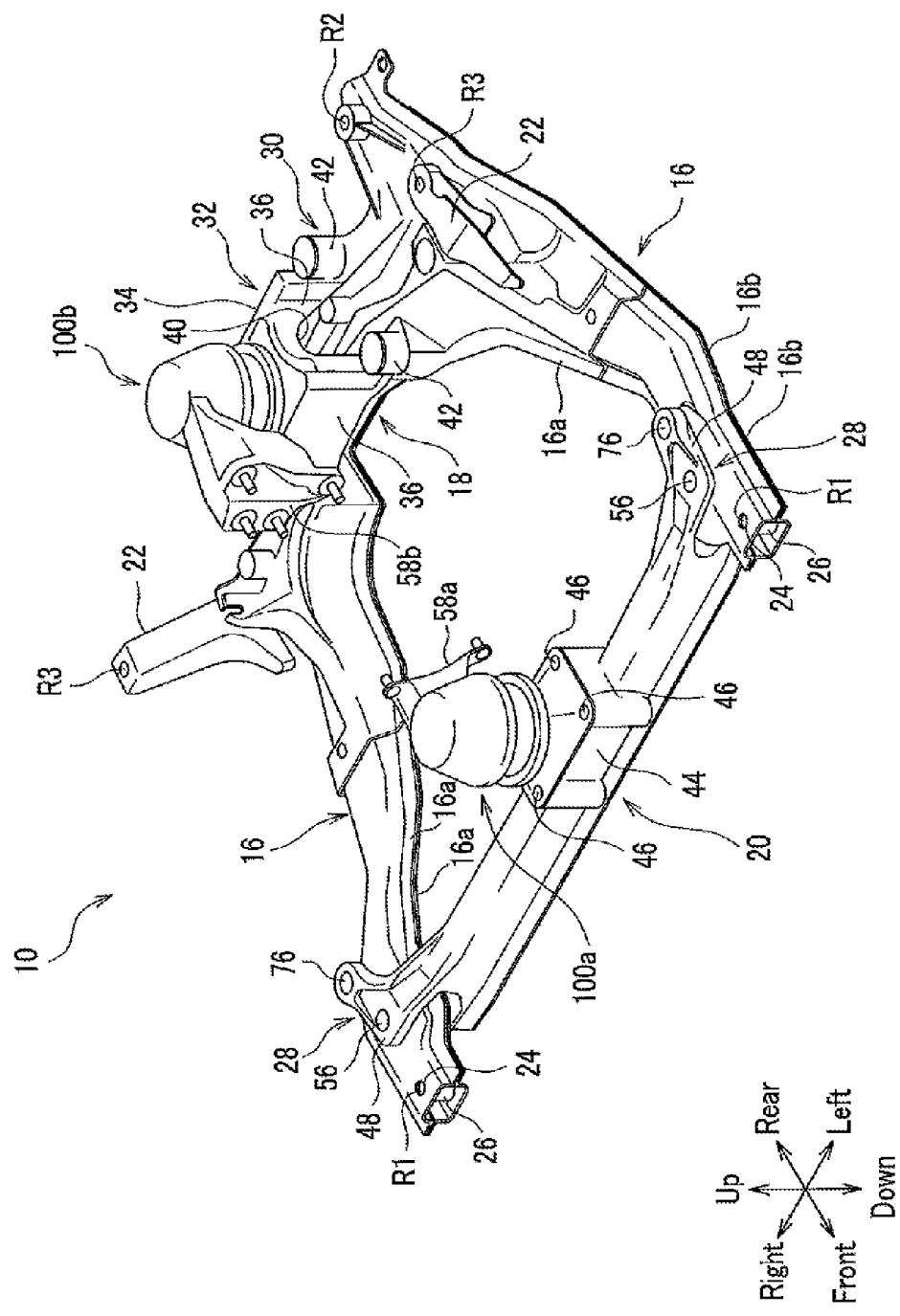
FIG. 3 is a perspective view of the subframe structure illustrated in FIG. 1.
Figure 4:
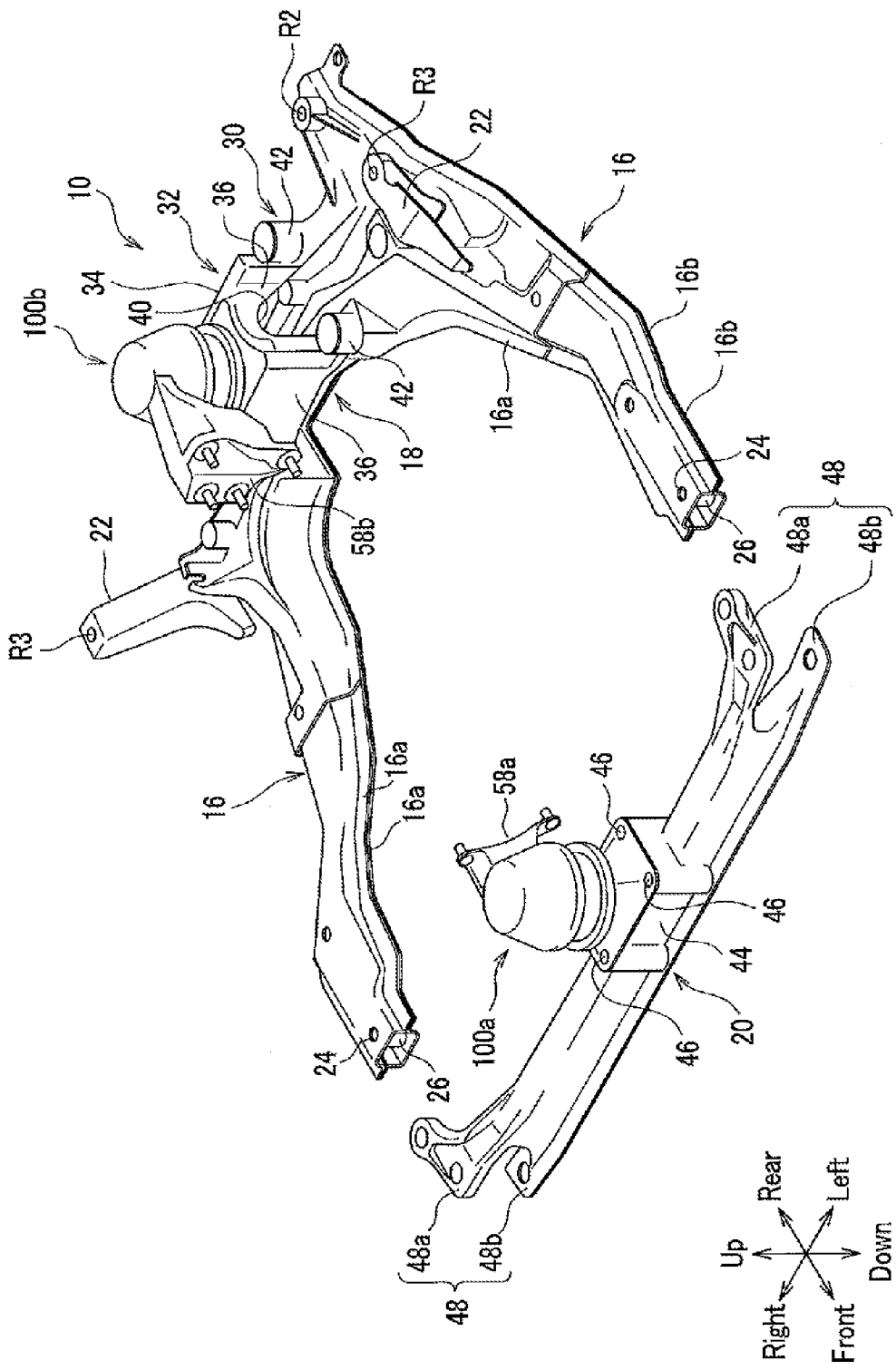
FIG. 4 is an exploded perspective view of the subframe structure illustrated in FIG. 2.
Figure 5:
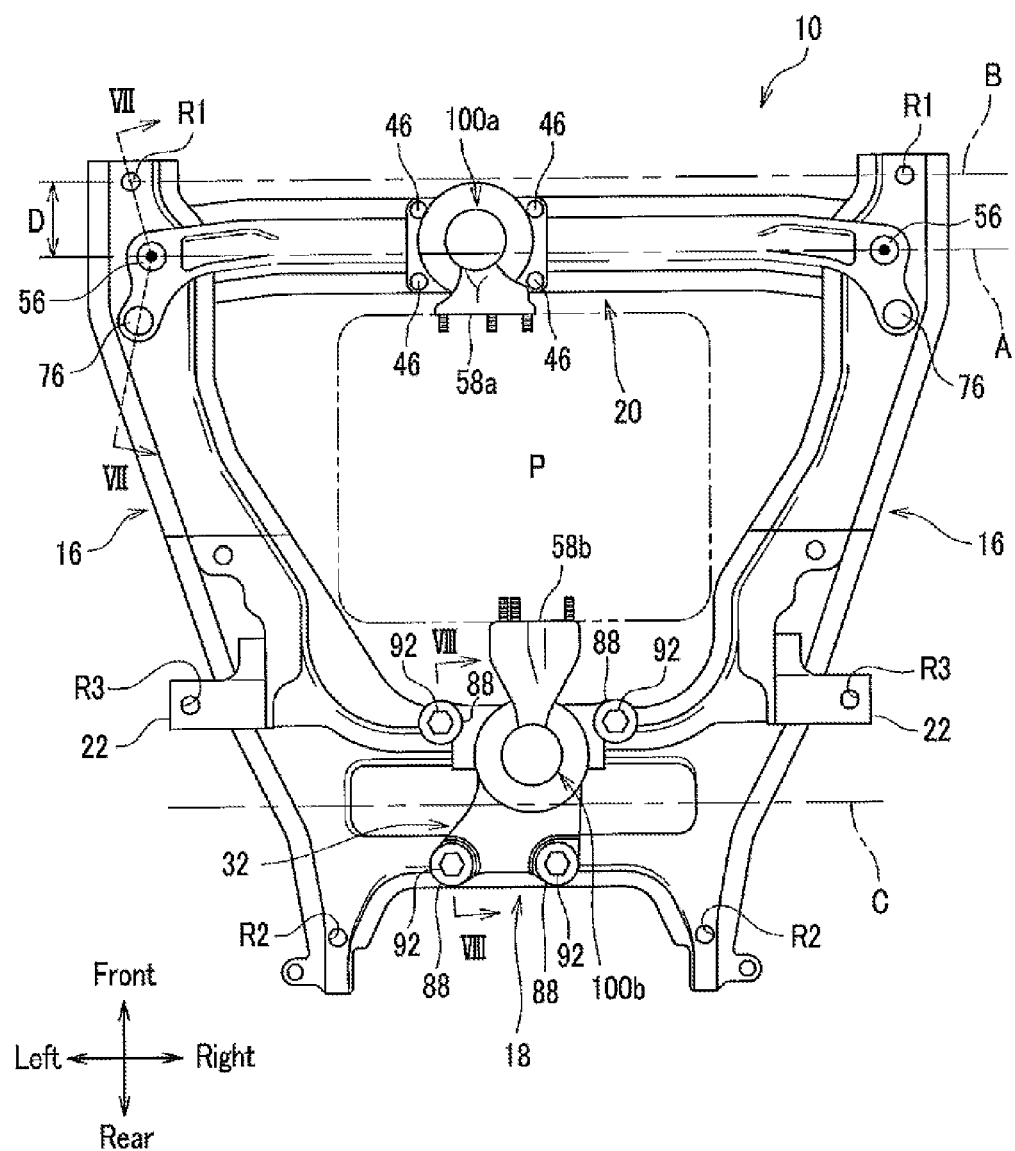
FIG. 5 is a plan view of the subframe structure illustrated in FIG. 2.
Figure 6:
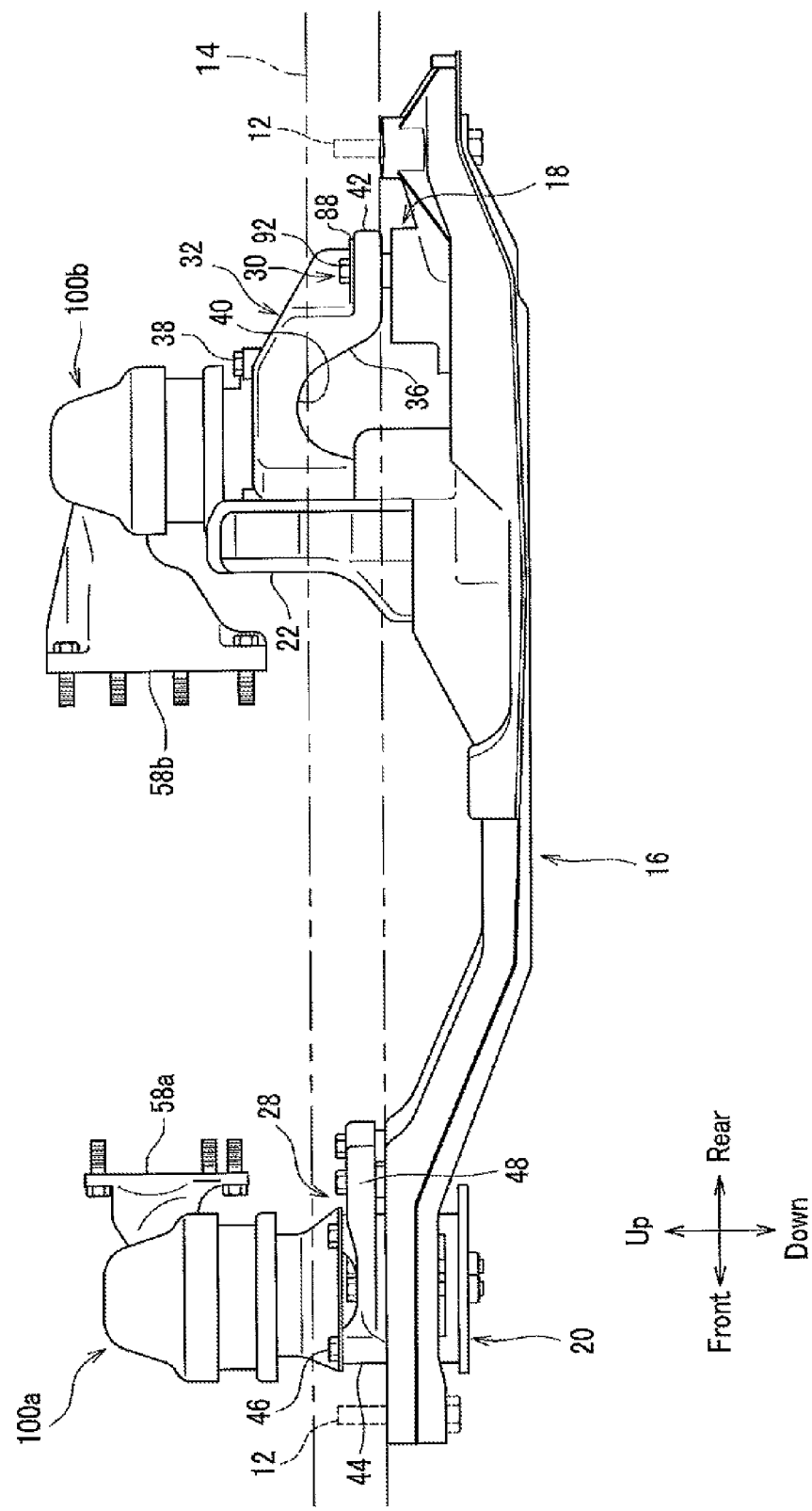
FIG. 6 is a side view of the subframe structure illustrated in FIG. 2.

Hereinbelow, an embodiment of the present invention is explained in detail by reference to drawings when necessary. FIG. 1 is a transparent perspective view illustrating an arrangement, in a front section of a vehicle, of a subframe structure according to an embodiment of the present invention. In addition, FIG. 2 is a transparent perspective view illustrating the subframe structure, where right and left front side frames and some other elements are removed from the arrangement illustrated in FIG. 1. Further, FIG. 3 is a perspective view of the subframe structure illustrated in FIG. 1, FIG. 4 is an exploded perspective view of the subframe structure illustrated in FIG. 3, FIG. 5 is a plan view of the subframe structure illustrated in FIG. 3, and FIG. 6 is a side view of the subframe structure illustrated in FIG. 3. In the respective drawings, the indications "Front" and "Rear" accompanying arrows indicate the front and rear directions, the indications "Up" and "Down" accompanying arrows indicate the up and down directions, and the indications "Right" and "Left" accompanying arrows indicate the right and left directions (vehicle width directions) viewed from the driver's position.

As illustrated in FIGS. 1 and 2, the subframe structure 10 according to the embodiment of the present invention is arranged in a front portion of the vehicle body, and is rigidly fixed to a vehicle-body frame 14 with a plurality of bolts 12 (illustrated in FIG. 2) which project vertically upward.

As illustrated in FIG. 1, the vehicle-body frame 14 includes a pair of right and left front side frames 14a, a pair of right and left connection frames 14b, and a front cross frame 14c. The right and left front side frames 14a each extend in the front-rear direction of the vehicle. The right and left connection frames 14b respectively connect the front portions of the right and left front side frames 14a to the subframe structure 10, which is located under the front portions of the right and left front side frames 14a. The front cross frame 14c extends in the vehicle width direction, and connects the right and left connection frames 14b to each other.

In addition, in FIG. 1, the reference S denotes a suspension mechanism. The suspension mechanism S includes a knuckle 11, a suspension upper arm 13, a suspension lower arm 15, a damper 17, and a damper spring 19. The knuckle 11 rotatably supports one of wheels W. The suspension upper arm 13 is connected to the upper portion of the knuckle 11, and the suspension lower arm 15 is connected to the lower portion of the knuckle 11. The damper 17 applies damping force to the vehicle body, and the damper spring 19 applies elastic force to the vehicle body.

As illustrated in FIG. 3, the subframe structure 10 includes a pair of right and left side members (longitudinal members) 16, a rear cross member 18, and a front cross member (lateral member or front lateral member) 20. Further, the subframe structure 10 includes the suspension lower arms (suspension arms) 15, which are respectively connected to the rear sides of the right and left side members 16 (as illustrated in FIG. 1). In the present embodiment, the pair of right and left side members 16 and the rear cross member 18 are integrally formed. However, the pair of right and left side members 16 and the rear cross member 18 need not be limited to such integral formation. For example, both ends, in the axial direction, of the rear cross member 18 may be weld joined to the portions, on the vehicle rear side, of the right and left side members 16.

The pair of right and left side members 16 are constituted by, for example, hollow members being formed of steel or the like to have rigidity, and are bilaterally symmetrically arranged to face each other. The side members 16 are arranged on the right-side portion and the left-side portion in the vehicle width direction, and extend along the front-rear direction of the vehicle. Specifically, each of the side members 16 is formed with an upper part and a lower part. An inside flange 16a and an outside flange 16b are respectively arranged on the inner side and the outer side of each of the upper part and the lower part of each of the side members 16. The inside flanges 16a of the upper part and the lower part constituting each of the side members 16 are overlapped in the vertical direction, and the outside flanges 16b of the upper part and the lower part in each of the side members 16 are also overlapped in the vertical direction. The overlapped inside flanges 16a and the overlapped outside flanges 16b are integrally joined, and the overlapped outside flanges 16b are also integrally joined, for example, by the well-known friction stir joining.

In addition, a plurality of fixing points R for rigidly fixing each side member 16 to the vehicle-body frame 14 are arranged on the side member 16. Specifically, the six fixing points in total (which are indicated by the filled circles in FIG. 10), i.e., the pair of first fixing points R1, the pair of second fixing points R2, and the pair of third fixing points R3, are arranged on the side members 16. The pair of first fixing points R1 are respectively arranged at the front ends of the side members 16, the pair of second fixing points R2 are respectively arranged at the rear ends of the side members 16, and the pair of third fixing points R3 are respectively arranged at the midway portions between the front ends and the rear ends of the side members 16.

Figure 7:
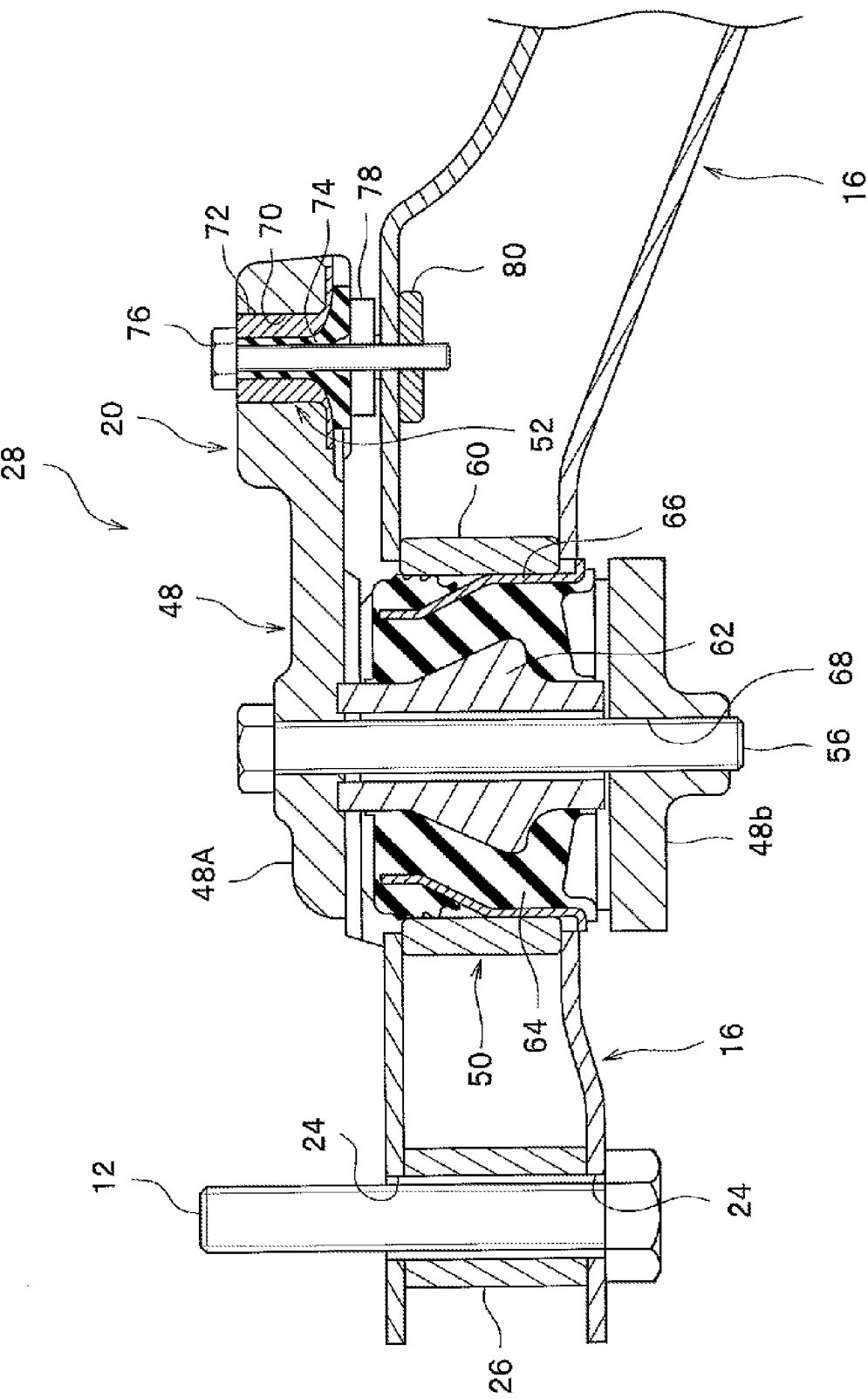
FIG. 7 is a longitudinal cross-sectional view of the subframe structure along the line VII-VII indicated in FIG. 5.

For example, as illustrated in FIG. 7 (which will be referred to later), a bolt 12, fastening holes 24, and a cylindrical part 26 are arranged at each of the first fixing points R1. The bolt 12 is a fixing means. The fastening holes 24 are formed in the upper and lower walls through which the bolt 12 passes. The cylindrical part 26 is connected between the upper and lower walls, and the bolt 12 penetrates through the cylindrical part 26.

The above first, second, and third fixing points R1, R2, and R3 in the present embodiment are the same as the fixing points arranged in the conventional subframes. The number and positions of the fixing points R are not specifically limited to the number and positions of the first, second, and third fixing points R1, R2, and R3.

The rear cross member 18 extends along the vehicle width direction, and is integrally coupled to the rear end portions of the right and left side members 16. A mounting bracket 32 is floatingly mounted through a second floating mechanism 30 (which will be explained later with reference to FIG. 6) on the approximately central portion, in the vehicle width direction, of the rear cross member 18.

Figure 8:
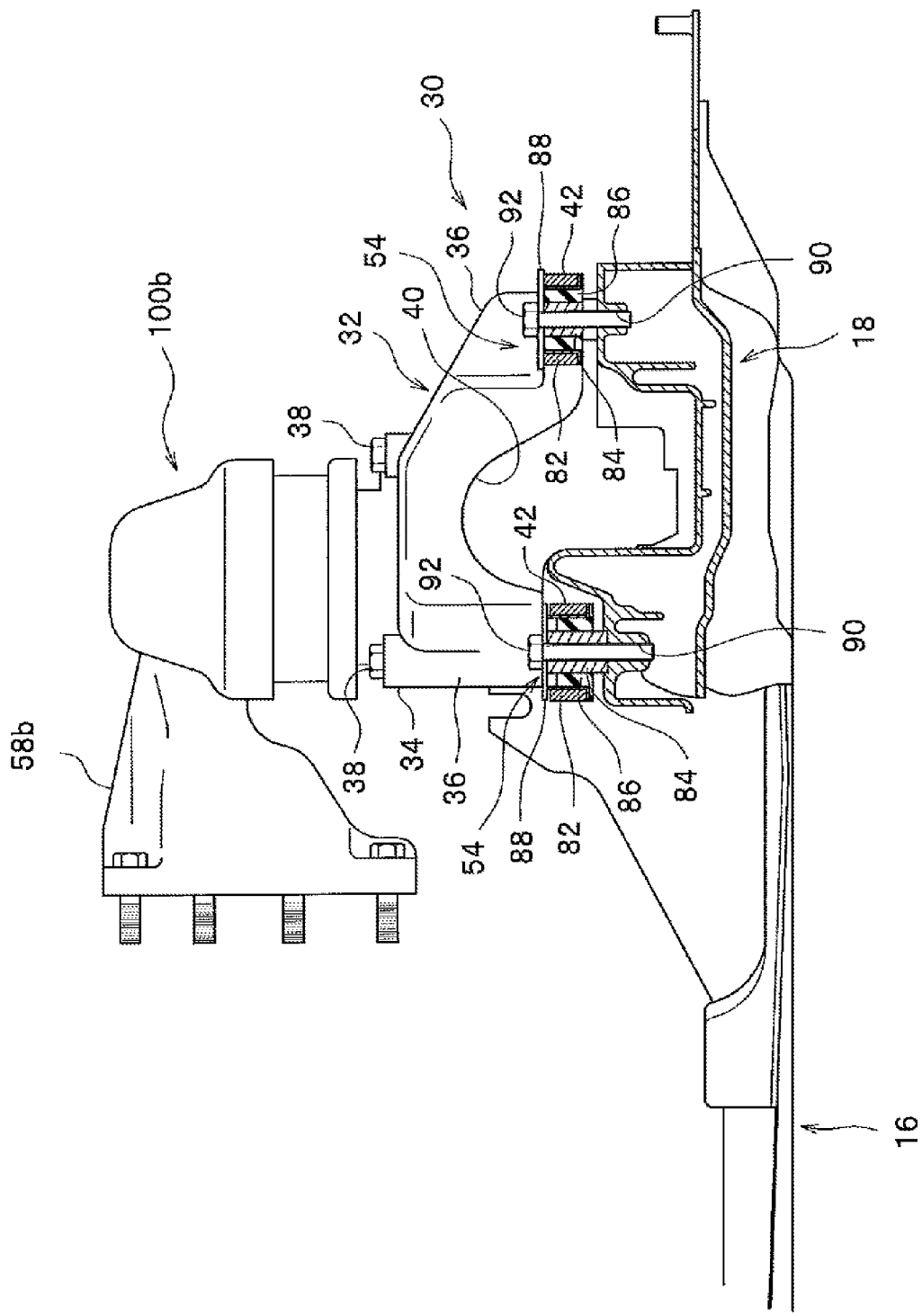
FIG. 8 is a longitudinal cross-sectional view of the subframe structure along the line VIII-VIII indicated in FIG. 5.

As illustrated in FIG. 8, the mounting bracket 32 is constituted by a supporting-and-fixing portion 34 and a leg portion 36. The supporting-and-fixing portion 34 has a mounting face, on which a second damping device 100b (which will be explained later) is mounted. The second damping device 100b is supported by and fixed to the mounting face with bolts 38. The leg portion 36 is formed continuously from the lower portion of the supporting-and-fixing portion 34, and is floatingly mounted on the upper surface of the rear cross member 18. The leg portion 36 is formed to branch into the front and rear directions through a concave portion 40 (which curves in side view as illustrated in FIG. 6) and bestride in the front-rear direction the center line C, extending along the vehicle width direction, of the rear cross member 18 (in plan view as illustrated in FIG. 5). Four annular elements 42 are arranged at the bottom ends of the leg portion 36, and third bushes 54 constituting the second floating mechanism 30 (which will be explained later) are respectively fitted into the bores in the annular elements 42.

Referring back to FIGS. 2 and 3, the front cross beam 20 extends along the vehicle width direction, and is floatingly supported through first floating mechanisms 28 (which will be explained later) by the front end portions of the pair of right and left side members 16. The front cross beam 20 is constituted, for example, by a hollow member formed of steel or the like to be rigid. The hollow member constituting the front cross beam 20 is manufactured separately from the pair of right and left side member 16 and the rear cross member 18.

A mounting portion 44 is arranged on the upper face of the approximately central portion, in the vehicle width direction, of the front cross beam 20. The mounting portion 44 is bulged out upward for mounting a first damping device 100a. The mounting portion 44 has a flat face having an approximately rectangular shape in plan view, and four bolt insertion holes (not shown) are formed at the four corners of the flat face. The first damping device 100a can be rigidly fixed to the front cross beam 20 by inserting bolts 46 respectively through the bolt insertion holes and fastening the bolts 46.

In addition, branched portions 48 are arranged at both ends of the front cross beam 20 in the vehicle width direction. Each branched portion 48 includes an upper piece 48a and a lower piece 48b which respectively branch to the upper and lower sides from a middle portion of the front cross beam 20. Each branched portion 48 has faces opposed to each other. The front end of each side member 16 is sandwiched and held by the branched piece 48 when the branched piece 48 and the front end of the side member 16 are fastened with a bush fastening bolt 56 (which will be explained later).

The first damping device 100*a* and the second damping device 100*b* are arranged in the subframe structure 10. The first damping device 100*a* supports the front side of an power plant P (vehicular power plant) through a metal fitting 58*a*, and the second damping device 100*b* supports the rear side of the power plant P through a metal fitting 58*b*. The first damping device 100*a* is rigidly fixed to the mounting portion 44 of the front cross beam 20 with the bolts 46, and the second damping device 100*b* is floatingly supported by the rear cross member 18 through the mounting bracket 32.

The first damping device 100*a* and the second damping device 100*b* have an identical structure, and are each configured to be an active damping device which exercises a proactive or counteracting vibration-damping effect on a vibrating object the vibration of which is to be damped, by causing a vibration with an actuator 141 (which will be explained later). The structures of the first and second damping devices 100*a* and 100*b* will be in detail explained later.

As illustrated in FIG. 7, the first floating mechanisms 28 are arranged at both ends, in the vehicle width direction, of the front cross beam 20, at which the front end portions of the side members 16 are respectively held by the branched portions 48 of the front cross beam 20 from the upper and lower sides. The first floating mechanisms 28 floatingly support as mass components the front cross beam 20 and the first damping device 100*a*.

The first floating mechanisms 28 are each constituted by a first bush (elastic mechanism) 50 and a second bush (elastic mechanism) 52. The first bush 50 and the second bush 52 are arranged a predetermined distance apart in the front-rear direction, and function as floating points F1 and F2. (See FIG. 10.)

The first bush 50 is arranged in a cylindrical element 60, which connects the upper and lower walls of each side member 16. The first bush 50 includes an inner cylinder 62 formed of metal, a first elastic element 64, an outer cylinder 66 formed of metal, and a bush fastening bolt 56. The first elastic element 64 is formed of rubber to have an approximately cylindrical shape by vulcanized adhesion to the outer circumferential surface of the inner cylinder 62. A portion of the outer cylinder 66 covers part of the outer circumferential surface of the first elastic element 64, and the remaining portion of the outer cylinder 66 is buried in the first elastic element 64. The bush fastening bolt 56 has a large length, penetrates through the inner cylinder 62 and the branched portion 48 in the front cross beam 20, and is fastened to a screw hole 68, which is arranged in the lower piece 48*b* of the branched portion 48. Alternatively, the outer cylinder 66 may be replaced with a plate spring. The first bush 50 is arranged at the joint between the side member (longitudinal member) 16 and the front cross beam (lateral member) 20.

The second bush 52 includes an outer cylinder 72, a second elastic element 74, a disk-like seat 78, and a bush fastening bolt 76. The outer cylinder 72 is fitted into a through-hole 70 formed in the upper piece 48*a* of the branched portion 48 of the front cross beam 20. The second elastic element 74 is a thin piece having an approximately cylindrical shape and a smaller diameter than the first elastic element 64. The disk-like seat 78 is inserted on the lower side of the upper piece 48*a* between the lower face (stopper face) of the second elastic element 74 and the upper face of the upper wall of each side member 16. The bush fastening bolt 76 has a small length, penetrates through the second elastic element 74, and is fastened to a disk member 80, which is arranged on the upper wall side of each side member 16. The second bush 52 is arranged above the side member (longitudinal member) 16 on the vehicle rear side of the first bush 50.

The first elastic element 64 constituting each first bush 50 and the second elastic element 74 constituting each second bush 52 are arranged side by side in the front-rear direction of the vehicle in plan view. The first elastic element 64 is arranged in each side member (longitudinal member) 16, and the second elastic element 74 is arranged on the vehicle rear side of the first elastic element 64. That is, the second elastic element 74 is arranged on the power plant P side of the first elastic element 64. (See FIG. 2 for the location of the power plant P.)

In addition, the second elastic element 74 is arranged at a higher elevation than the elevation of the side member (longitudinal member) 16 at the location at which the first elastic element 64 is arranged. That is, the elastic center of the second elastic element 74 is located above the elastic center of the first elastic element 64.

Further, as mentioned before, the second elastic element 74 is formed as a thin piece having an approximately cylindrical shape and a smaller diameter than the first elastic element 64. That is, the second elastic element 74 is formed in a smaller size than the first elastic element 64. In other words, the spring constant of the second elastic element 74 is set smaller than the spring constant of the first elastic element 64.

In addition, as illustrated in FIG. 5, the right and left side member 16 is arranged in such a manner that the phantom line A connecting the centers of the bush fastening bolts 56 in the first bushes 50 respectively arranged on the pair of right and left side members 16 is the predetermined distance D offset rearward from the phantom line B connecting the first fixing points R1 at which the side members 16 are rigidly fixed to the vehicle-body frame 14. The above offset enables simple arrangement of the first floating mechanisms 28 without changing the conventional fixing points to the vehicle-body frame. The phantom line A connecting the centers of the bush fastening bolts 56 in the first bushes 50 coincides with the center line of the front cross beam 20.

The second floating mechanism 30 is arranged on the approximately central portion, in the vehicle width direction, of the rear cross member 18 at a position at which the leg portion 36 of the mounting bracket 32 supporting the second damping device 100*b* is mounted on the rear cross member 18. The second floating mechanism 30 floatingly supports as the mass components the second damping device 100*b* and the mounting bracket 32.

The second floating mechanism 30 is constituted by the four third bushes 54, which have identical structures and are fitted in the bores of the four annular elements 42 in the leg portion 36. The four third bushes 54 function as floating points F3 as explained later.

As illustrated in FIG. 8, each third bush 54 includes an outer cylinder 82, an inner cylinder 84, a cylindrical bush 86, a disk-like seat 88, and a bush fastening bolt 92. The cylindrical bush 86 is inserted between the outer cylinder 82 and the inner cylinder 84, and adhered to the inner circumferential surface of the outer cylinder 82 and the outer circumferential surface of the inner cylinder 84 by vulcanized adhesion. The disk-like seat 88 is arranged on the upper surface of the annular element 42. The bush fastening bolt 92 penetrates through the disk-like seat 88 and the inner cylinder 84, and is fastened to a screw portion 90, which is arranged on an inner wall of the rear cross member 18.

Next, the structure and operations of the damping devices are explained below.

Figure 9:
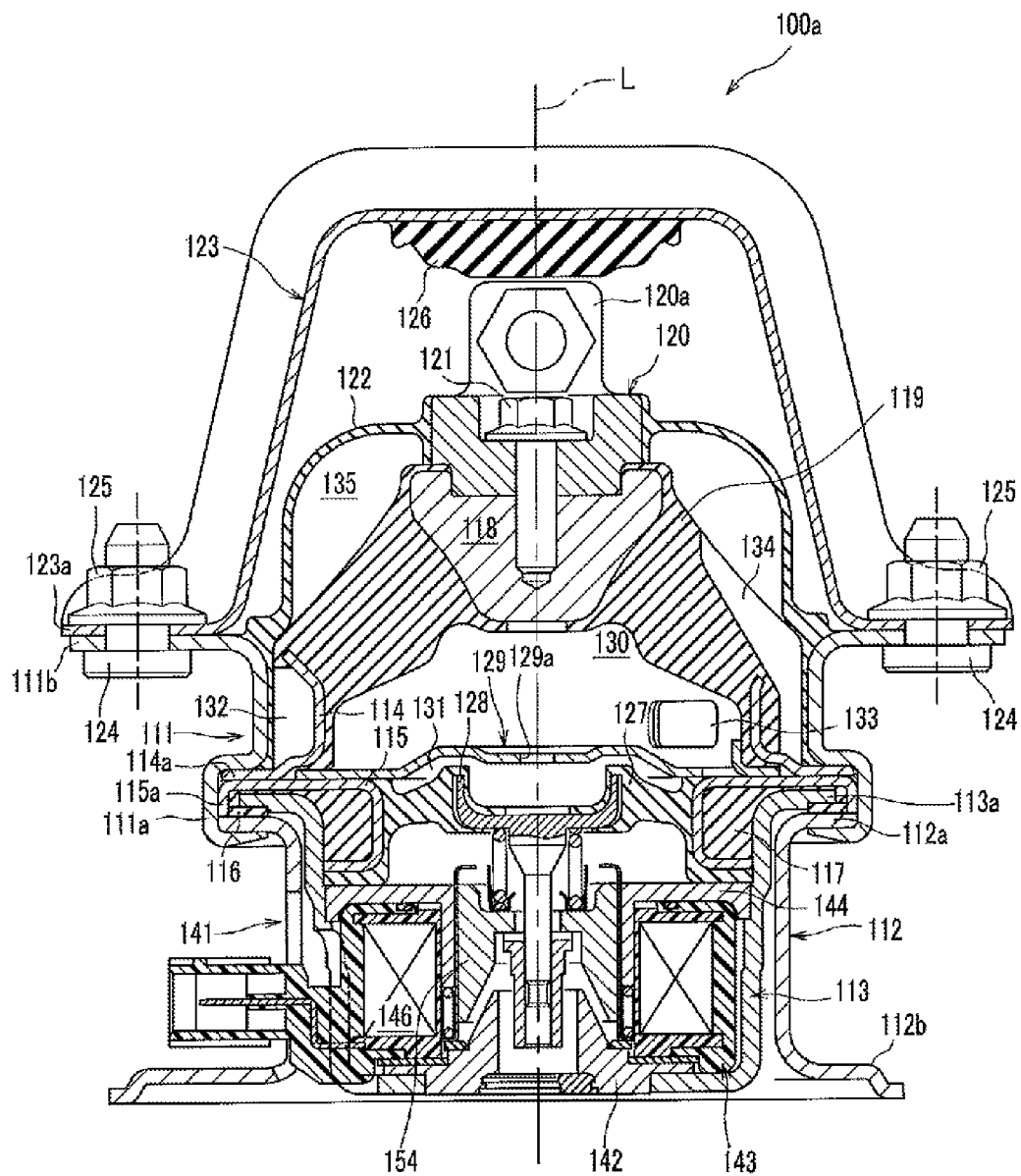
FIG. 9 is a longitudinal cross-sectional view illustrating an outline of the structure of a first damping device mounted on the subframe structure illustrated in FIG. 3.

FIG. 9 is a longitudinal cross-sectional view illustrating an outline of the structure of the first damping device 100a mounted on the subframe structure 10 illustrated in FIG. 3. The structures of the first damping device 100a and the second damping device 100b above the mounting portion 44 and the mounting bracket 32 are identical. Therefore, only the structure of the first damping device 100a is explained in detail below, and explanation on the structure of the second damping device 100b is omitted. Although the first damping device 100a illustrated in FIG. 9 is a liquid-seal type, the first damping device 100a is not limited to the liquid-seal type. Further, although the first damping device 100a is desirably an active damping device, the first damping device 100a is not limited to the active damping device.

As illustrated in FIG. 9, the first damping device 100a has a structure substantially axially symmetric with respect to the axis L, and is constituted by an upper housing 111, a lower housing 112, an actuator case 113, a diaphragm 122, a first rubber support ring 114, a first rubber element 119, a second rubber support ring 115, a second rubber element 127, the aforementioned actuator 141, and some other elements. The upper housing 111 has an approximately cylindrical shape. The lower housing 112 has an approximately cylindrical shape and is arranged on the lower side of the upper housing 111. The actuator case 113 has an upward open, approximately cup-like shape, and is housed in the lower housing 112. The diaphragm 122 is bonded to the upper side of the upper housing 111. The first rubber support ring 114 has an annular shape, and is housed in the upper housing 111. The first rubber element 119 is bonded to the upper side of the first rubber support ring 114. The second rubber support ring 115 has an annular shape, and is housed in the actuator case 113. The second rubber element 127 is bonded to the inner circumference side of the second rubber support ring 115. The actuator 141 is housed in the actuator case 113 to be arranged on the lower side of the second rubber support ring 115 and the second rubber element 127.

The second rubber support ring 115 is arranged on the upper inside of the actuator case 113, has an approximately U-shaped vertical cross section, includes outer-peripheral portions on upper and lower sides. An outer-peripheral flange portion 113a of the actuator case 113, an outer-peripheral portion 114a of the first rubber support ring 114, and the outer-peripheral portion 115a of the upper side of the second rubber support ring 115 are overlapped between a bottom-end flange portion 111a of the upper housing 111 and a top-end flange portion 112a of the lower housing 112, and are then pressed to be bound together.

In the above arrangement, a first floating rubber element 116 having an annular shape is inserted between the top-end flange portion 112a and the outer-peripheral flange portion 113a, and a second floating rubber element 117 having an annular shape is inserted between the upper face of the outer-peripheral flange portion 113a and the lower face of the upper-side outer-peripheral portion 115a of the second rubber support ring 115. Thus, the actuator case 113 is floatingly supported such that the actuator case 113 can be moved in the vertical direction relatively to the upper housing 111 and the lower housing 112.

The first rubber element 119 is formed of thick rubber, and a recessed portion is arranged on the upper face of the first rubber element 119. A first rubber support boss 118 is arranged in the recessed portion. The first rubber support ring 114 and the first rubber support boss 118 are respectively bonded to the bottom end and the top end of the first rubber element 119 by vulcanized adhesion. A diaphragm support boss 120 is fixed to the upper face of the first rubber support boss 118 with a bolt member 121. The inner peripheral portion of the diaphragm 122 is bonded to the diaphragm support boss 120 by vulcanized adhesion, and the outer-peripheral portion of the diaphragm 122 is bonded to the upper housing 111 by vulcanized adhesion.

Further, a power-plant mounting portion 120a is integrally formed on the upper face of the diaphragm support boss 120, and is fixed to the power plant P side. In addition, a vehicle-body-side mounting portion 112b, which is arranged at the bottom end of the lower housing 112, is fixed to the front cross beam 20. In the second damping device 100b, the vehicle-body-side mounting portion 112b at the bottom end of the lower housing 112 is fixed to the mounting bracket 32.

A flange portion 123a, which is arranged at the bottom end of a stopper member 123, is connected with bolts 124 and nuts 125 to a flange portion 111b, which is arranged at the top end of the upper housing 111. In addition, a stopper rubber element 126 is attached to an upper area of the inner surface of the stopper member 123, and the power-plant mounting portion 120a, which is arranged to protrude from the upper face of the diaphragm support boss 120, faces the stopper rubber element 126 such that the power-plant mounting portion 120a can come into contact with the stopper rubber element 126.

The second rubber element 127 is formed of film-like rubber, and the outer-peripheral portion of the second rubber element 127 is bonded to the inner-peripheral surface of the second rubber support ring 115 by vulcanized adhesion, and a movable member 128 is bonded to the second rubber element 127 by vulcanized adhesion in such a manner that an upper portion of the movable member 128 is buried in a central portion of the second rubber element 127.

In addition, a disk-like barrier member 129 is fixed between the upper face of the second rubber support ring 115 and a lower portion of the first rubber support ring 114. A first liquid chamber 130 is partitioned off with the first rubber support ring 114, the first rubber element 119, and the barrier member 129. Further, a second liquid chamber 131 is partitioned off with the barrier member 129 and the second rubber element 127. The first liquid chamber 130 and the second liquid chamber 131 communicate with each other through a communication hole 129a, which is open in the center of the barrier member 129.

An annular communication path 132 is formed between the first rubber support ring 114 and the upper housing 111. The communication path 132 communicates with the first liquid chamber 130 through a communication hole 133, and also communicates through an annular communication gap 134 with a third liquid chamber 135, which is partitioned off with the first rubber element 119 and the diaphragm 122.

The actuator 141 is constituted by a fixed core 142, a coil assembly 143, a yoke 144, a movable core 154, and some other elements. The fixed core 142 is mainly formed of a metal or an alloy having high magnetic permeability. The coil assembly 143 includes coils 146.

When the coils 146 in the actuator 141 are energized by current supply, the coils 146 attract the movable core 154, and move the movable member 128 downward. The movement of the movable member 128 causes the second rubber element 127 (with which the second liquid chamber 131 is partitioned off) to deform downward, so that the volume of the second liquid chamber 131 increases. When the volume of the second liquid chamber 131 increases, the incompressible fluid in the first liquid chamber 130 which is compressed by the pressing load from the power plant P side flows into the second liquid chamber 131 through the communication hole 129a. Therefore, the load transmitted from the power plant P side to the vehicle body side (the vehicle interior side) can be reduced.

On the other hand, when the core in the coils 146 is demagnetized, the second rubber element 127 is transformed upward by the elastic force of the second rubber element 127, so that the movable member 128 and the movable core 154 are lifted, and the volume of the second liquid chamber 131 decreases. Then, the incompressible fluid in second liquid chamber 131 flows through the communication hole 129a into the first liquid chamber 130 in which the pressure is reduced by the pulling load from the power plant P side. As a result, the load transmitted from the power plant P side to the vehicle body side (the vehicle interior side) can also be reduced.

As explained above, the first damping device 100a and the second damping device 100b each function as an active damping device, and vibrating force caused by the displacement driving of the actuator 141 is exerted on the incompressible fluid sealed in the first liquid chamber 130, so that vibrations inputted from the power plant P are reduced in a proactive or counteracting manner.

The subframe structure 10 according to the present embodiment is basically configured as above, and operates and has advantageous effects as explained below.

FIG. 10 is a schematic plan view indicating positional relationships between fixing points and floating points on the subframe structure illustrated in FIG. 3.

As illustrated in FIG. 10, in the subframe structure 10 according to the present embodiment, the first to third fixing points R1 to R3 (in the number of six in total on both sides) for rigidly fixing the subframe structure 10 to the right and left front side frames 14a are arranged a predetermined distance apart along the front-rear direction on each of the right and left side members 16 (longitudinal members). In addition, the four floating points F1 and F2 are arranged for floatingly supporting the front cross beam 20 with the first elastic elements 64 in the first bushes 50 and the second elastic elements 74 in the second bushes 52 which constitute the first floating mechanisms 28. Further, the four floating points F3 are arranged for floatingly supporting the mounting bracket 32 and the second damping device 100b with the cylindrical bushes 86 in the four third bushes 54 which constitute the second floating mechanism 30.

That is, on the front side of the subframe structure 10 according to the present embodiment, vibrations inputted from the power plant P (e.g., the engine vibration input indicated in FIG. 11) are reduced in a proactive or counteracting manner by the first damping device 100a fixed to the front cross beam 20, and the first floating mechanisms 28 provided with the first bushes 50 and the second bushes 52 which floatingly support the front cross beam 20 on the respective side members 16 are arranged. As a result, the function of reducing vibrations with the first damping device 100a and the function of reducing vibrations with the first floating mechanisms 28 cooperate. That is, the doubled effect of reducing vibrations (or vibration transmittability) is obtained on the front side of the subframe structure 10.

In addition, on the rear side of the subframe structure 10 according to the present embodiment, vibrations inputted from the power plant P are reduced in a proactive or counteracting manner by the second damping device 100b which is arranged on the rear cross member 18 through the mounting bracket 32, and the second floating mechanism 30 provided with the third bushes 54 which floatingly support the mounting bracket 32 and the second damping device 100b is arranged between the mounting bracket 32 and the rear cross member 18. As a result, the function of reducing vibrations (or vibration transmittability) with the second damping device 100b and the function of reducing vibrations with the second floating mechanism 30 cooperate. That is, the doubled effect of reducing vibrations (or vibration transmittability) is obtained on the rear side of the subframe structure 10.

As explained above, according to the present embodiment, the doubled vibration-reduction effect of reducing the vibrations inputted from the power plant P is achieved by the above cooperations over the entire subframe structure including both of the front and rear sides.

Figure 11:
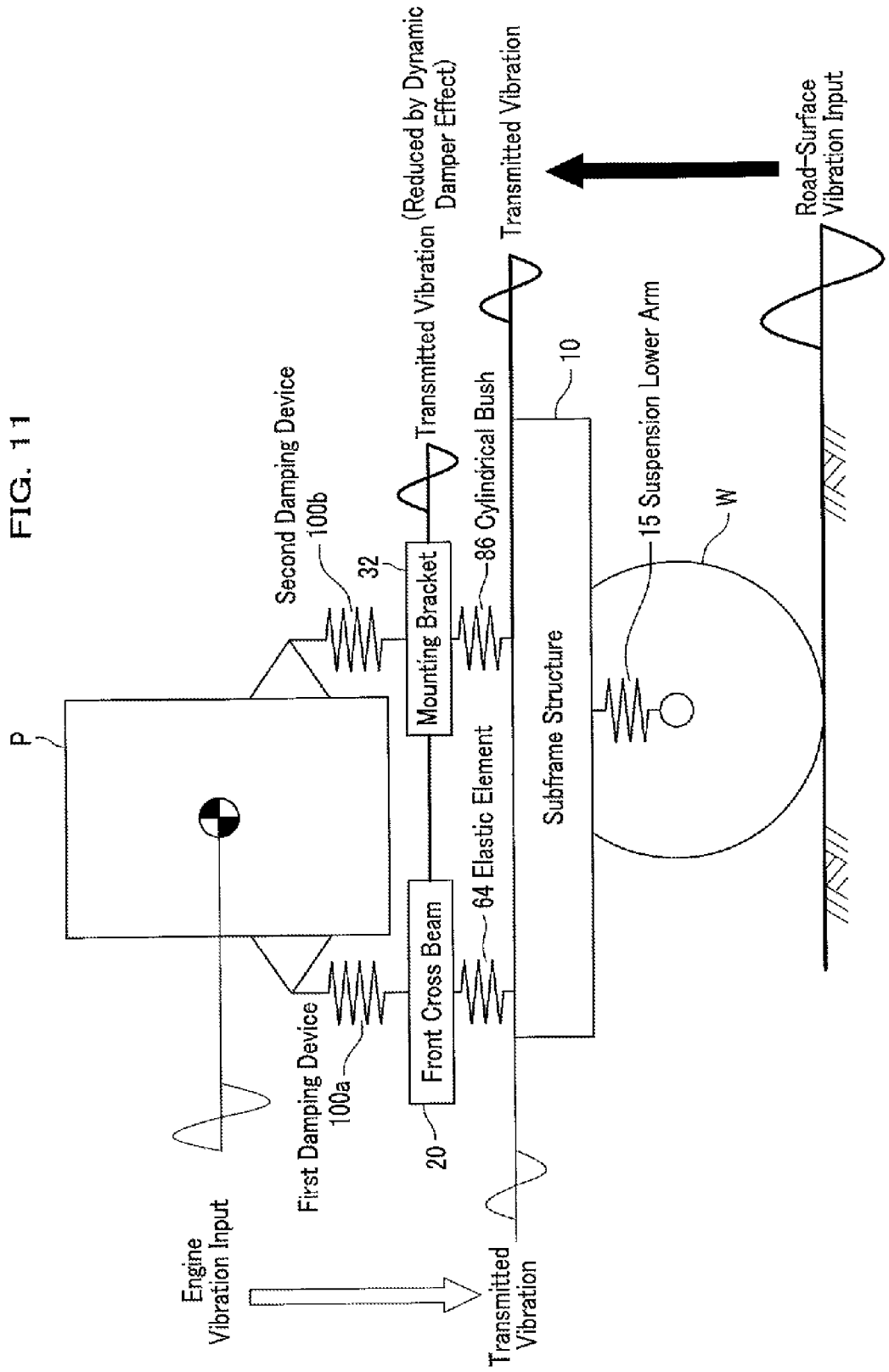
FIG. 11 is a schematic diagram presented for illustrating a dynamic damper effect.
Figure 12:
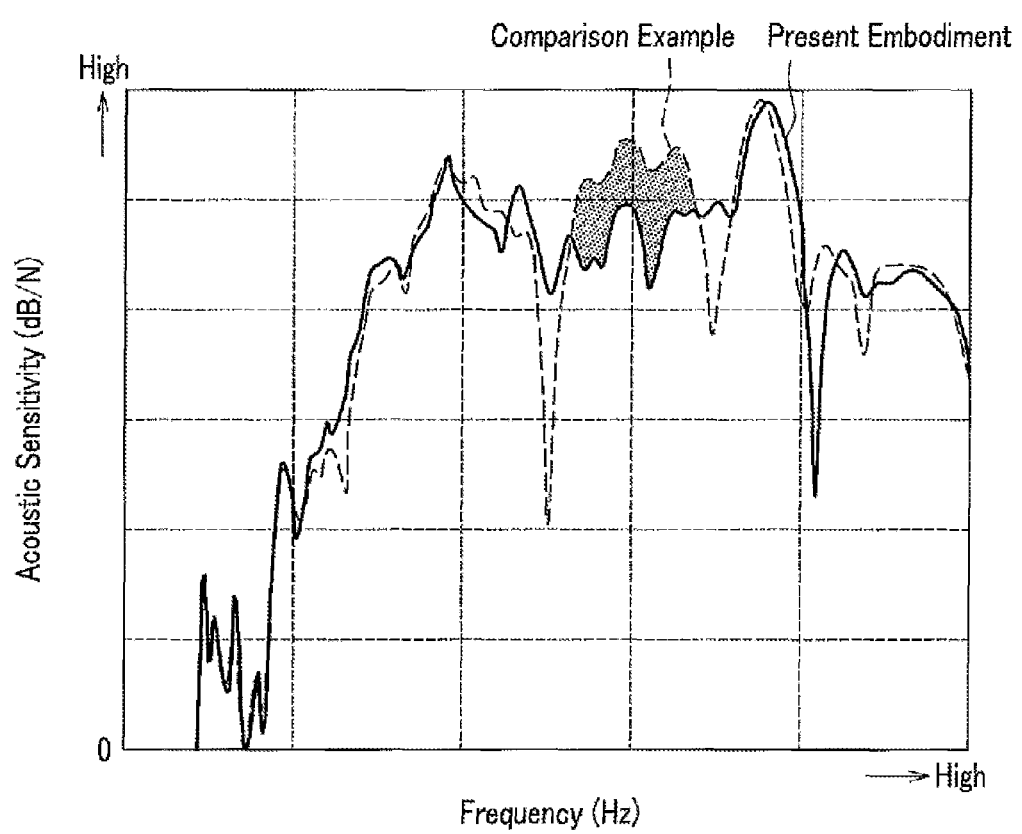
FIG. 12 is a characteristic diagram indicating a relationship between the frequency and the acoustic sensitivity.

Next, the dynamic damper effect of the subframe structure 10 is explained below. FIG. 11 is a schematic diagram presented for illustrating the dynamic damper effect, FIG. 12 is a characteristic diagram indicating a relationship between the frequency and the acoustic sensitivity, and FIG. 13 is a front view indicating a manner in which the front cross beam rotates in the vehicle-body rolling direction in association with elastic resonant vibrations of the right and left front side frames.

As illustrated in FIG. 11, the wheels W in contact with a road surface are elastically supported by the suspension lower arms 15, which are arranged on the lower side of the subframe structure 10. In addition, the subframe structure 10 includes: the first elastic elements 64 and the first damping device 100a which is arranged on the front cross beam 20 to floatingly support the power plant P; and the cylindrical bushes 86 and the second damping device 100b which is arranged on the mounting bracket 32 on the rear cross member 18 to floatingly support the power plant P.

When the power plant P in the configuration illustrated in FIG. 11 is driven, the vibrations caused by the driving of the power plant P (e.g., the engine vibration input) are transmitted to the subframe structure 10. At this time, the first damping device 100a, the first elastic elements 64, the second damping device 100b, and the cylindrical bushes 86, which are arranged in the subframe structure 100, provide the doubled vibration-reduction effect. On the other hand, the road-surface vibrations inputted from the road surface with which the wheels W are in contact are transmitted through the wheels W and the suspension lower arms 15 to the subframe structure 10.

In the above vibration transmission structure, the first damping device 100a and the front cross beam 20 are mass components floatingly supported by the first elastic elements 64, and the second damping device 100b and the mounting bracket 32 are mass components floatingly supported by the cylindrical bushes 86, so that the power plant P resonantly vibrates. The resonant vibration of the power plant P absorbs in the resonant vibration range the vibration energy of the road-surface vibrations inputted from the suspension lower arms 15 to the subframe structure 10, so that the road-surface vibrations can be reduced.

As explained above, according to the present embodiment, the subframe structure 10 provided with the first damping device 100a, the front cross beam 20, the first elastic elements 64, the second damping device 100b, the mounting bracket 32, and the cylindrical bushes 86 functions as the so-called dynamic damper, and can reduce the road-surface vibrations inputted through the suspension lower arms 15, at specific frequencies in the resonant frequency range (around the resonant frequency).

In the characteristic relationship between the frequency (Hz) and the acoustic sensitivity (dB/N) indicated in FIG. 12, the dashed curve is a characteristic curve of a subframe structure as a comparison example which is rigidly fixed to the vehicle-body frame 14 and is not provided with the first and second floating mechanisms 28 and 30, and the solid curve is a characteristic curve of the subframe structure 10 according to the present embodiment. In the present embodiment, the acoustic sensitivity in the resonant frequency range is lowered (as indicated by shading in FIG. 12), compared with the comparison example. That is, the subframe structure 10 functions as a dynamic damper.

For example, as illustrated in FIG. 13, the road-surface vibrations inputted through the suspension lower arms 15 cause the pair of right and left front side frames 14a (which function as the longitudinal members) to vertically vibrate in elastic resonance. At this time, the front cross beam 20 which functions as the aforementioned front lateral member and is floatingly supported through the first floating mechanisms 28 resonates in the vehicle-body rolling direction (the direction indicated by the arrows E in FIG. 13) in opposite phase to the elastic resonant vibrations of the right and left front side frames 14a. As a result, the road-surface vibrations inputted from the suspension lower arms 15 to the subframe structure 10 are further reduced by cancellation with the resonant vibration of the front cross beam 20 in the vehicle-body rolling direction in the opposite phase.

In addition, according to the present embodiment, the front cross beam 20, on which the first damping device 100a is mounted, is floatingly supported through the first bushes 50 (each including the first elastic element 64) and the second bushes 52 (each including the second elastic element 74). Therefore, the subframe structure 10 according to the present embodiment can achieve a vibration-reduction effect which is equivalent to or more than the vibration-reduction effect obtained in the case where the entire subframe is simply floatingly supported on the vehicle-body frame 14.

Further, according to the present embodiment, the subframe structure 10 has a simple structure in which the separately formed front cross beam 20 extending along the vehicle width direction is attached to the front end portions of the right and left side members 16. Therefore, the conventional subframe structure can be simply utilized.

Furthermore, according to the present embodiment, the first bushes 50 and the second bushes 52 can be configured to have different spring forces, and the spring forces can be separately adjusted.

Next, the operations and advantageous effects of the first elastic element 64 constituting each first bush 50 and the second elastic element 74 constituting each second bush 52 are explained below. In the subframe structure 10, the first elastic element 64 and the second elastic element 74, which realize floating support of the front cross beam (lateral member) 20 by each side member 16, are separately arranged in the front-rear direction of the vehicle. Therefore, when a vibration load is inputted from the power plant P to the front cross beam (lateral member) 20, the subframe structure 10 can decentralize the elastic centers to the first elastic elements 64 and the second elastic elements 74. Thus, in the subframe structure 10 configured as above, it is possible to satisfactorily maintain the performance in reduction of the vibrations transmitted from the power plant P to the vehicle-body frame 14, and reduce the size of the mount around the first bush 50 and the second bush 52.

In addition, in the subframe structure 10 configured as above, the separation into the first elastic elements 64 and the second elastic elements 74 enables reduction of the vibration transmission rate from the power plant P to the vehicle-body frame 14 without changing the spring constants of the elastic elements.

Further, in the subframe structure 10 configured as above, the first elastic element 64 is in the front cross beam (lateral member) 20, and the second elastic element 74 is arranged nearer to the power plant P than the first elastic element 64.

Since, in the subframe structure 10 configured as above, the elastic mechanism is separated into the first elastic elements 64 and the second elastic elements 74, the rotation centers of the front cross beam (lateral member) 20 in rigid-body resonant modes (rotational modes), i.e., the pitch, roll, and yaw, are shifted toward the power plant P from the rotation center of the elastic mechanism in which elastic elements are not separated. Therefore, in the subframe structure 10 configured as above, the acoustic sensitivity in the rigid-body resonant frequency range can be efficiently lowered, compared with the case where elastic elements are not separated.

Further, in the subframe structure 10 configured as above, the second elastic element 74 is arranged at a higher elevation than the elevation of the side member (longitudinal member) 16 at the location at which the first elastic element 64 is arranged. That is, the elastic center of the second elastic element 74 is located above the elastic center of the first elastic element 64 (as illustrated in FIG. 7).

Figure 14:
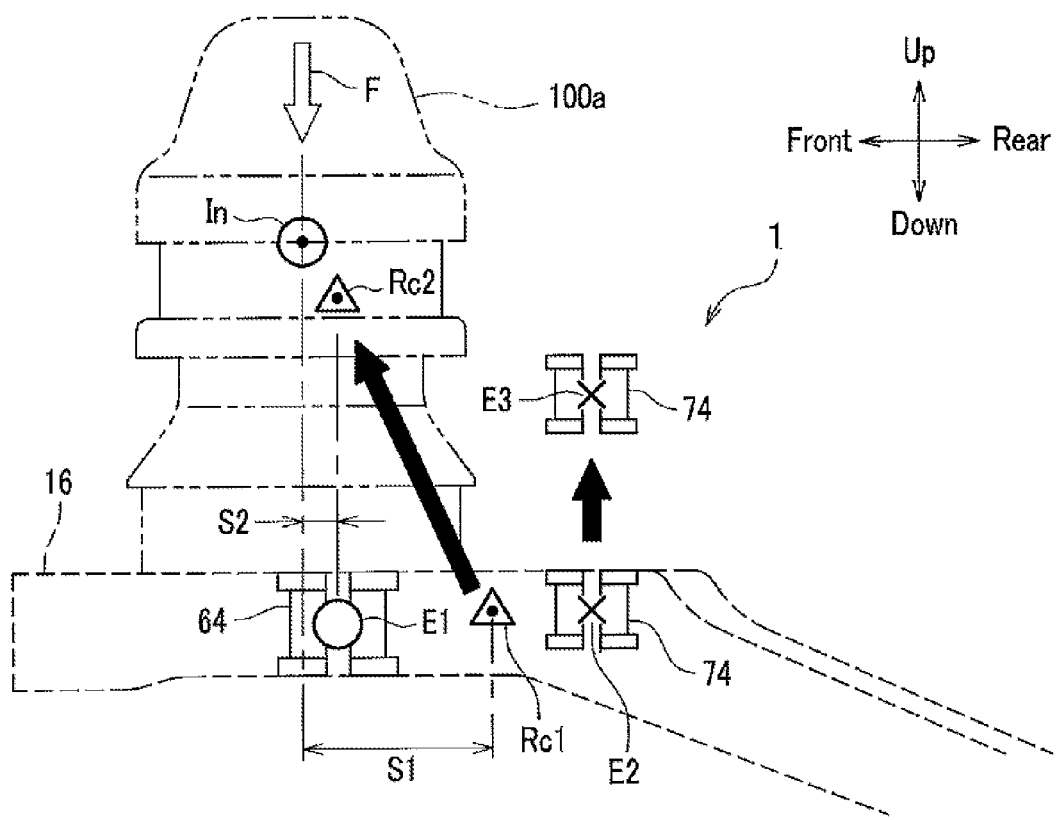
FIG. 14 is a schematic diagram illustrating a manner in which the rotation center of the front cross beam (lateral member) in a rigid-body resonant mode (rotational mode) moves by upward movement of a second elastic element constituting a second bush.
Figure 15:
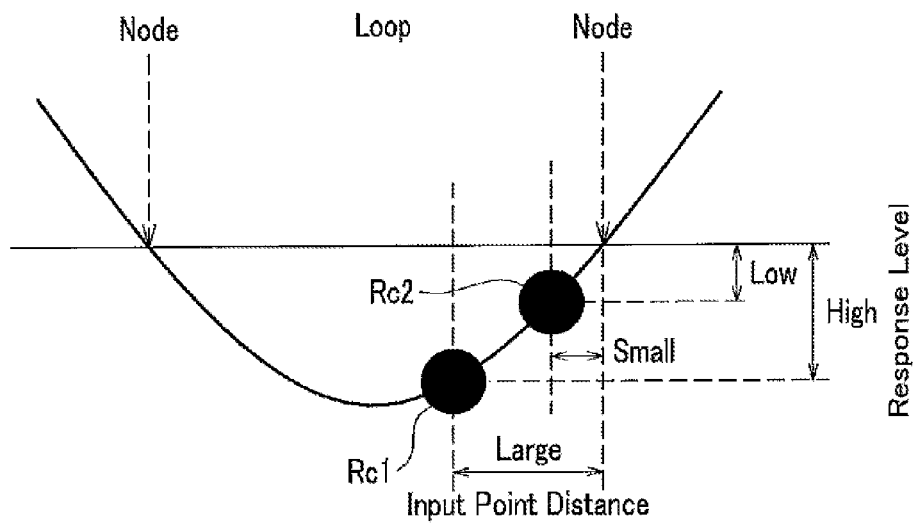
FIG. 15 is a graph indicating a relationship between the response level and the position of the rotation center of the front cross beam (lateral member) in the rigid-body resonant mode (rotational mode).

FIG. 14 is a schematic diagram illustrating a manner in which the rotation center of the front cross beam (lateral member) 20 in a rigid-body resonant mode (rotational mode) moves by upward movement of the second elastic element 74 constituting the second bush 52, and FIG. 15 is a graph indicating a relationship between the response level and the position Rc1 or Rc2 of the rotation center of the front cross beam (lateral member) 20 in the rigid-body resonant mode (rotational mode).

In FIG. 14, the reference In denotes the input point in the first damping device 100a from which a vibration load F from the power plant P is inputted (as illustrated in FIG. 5), E1 denotes the elastic center of the first elastic element 64, E2 denotes the elastic center of the second elastic element 74 when the second elastic element 74 is arranged at the same elevation as the side member 16, E3 denotes the elastic center of the second elastic element 74 when the second elastic element 74 is arranged at a higher elevation than the first elastic element 64, Rc1 denotes the position of the rotation center before movement of the second elastic element 74, and Rc2 denotes the position of the rotation center after the movement of the second elastic element 74.

As illustrated in FIG. 14, when the second elastic element 74 in the subframe structure 10 is moved upward from the position at the same elevation as the side member 16, the rotation center of the front cross beam 20 (illustrated in FIGS. 3 and 5) moves from the position Rc1 to the position Rc2. That is, the rotation center of the front cross beam 20 comes closer to the input point In of the vibration load F. Thus, the input span, which is represented by the horizontal distance between the input point In and the rotation center, is reduced from S1 to S2.

In addition, as illustrated in FIG. 15, when the rotation center moves from the position Rc1 to the position Rc2 in a rigid-body resonant mode (rotational mode) of the front cross beam 20 (illustrated in FIGS. 3 and 5) having predetermined nodes and a loop, the response level is lowered. In FIG. 15, the horizontal distance between the rotation center and a node corresponds to the input point distance from the node. When the rotation center moves from the position Rc1 to the position Rc2, the input point distance decreases from "Large" to "Small". In addition, the vertical distance between the rotation center and the node corresponds to the response level. When the rotation center moves from the position Rc1 to the position Rc2, the response level is lowered from "High" to "Low". In other words, as illustrated in FIG. 14, when the second elastic element 74 is moved upward to bring the rotation center close to the input point In, the response level is lowered. At this time, the input point In is regarded as a node in the rotational mode.

In the subframe structure 10 configured as above, the response level can be lowered by bringing the rotation center of the side member (longitudinal member) 16 in the rigid-body resonant mode (rotational mode) close to the input point of the vibration load so as to reduce the input span. Therefore, the acoustic sensitivity in the rigid-body resonant frequency range can be further efficiently lowered.

<Concrete Example>

Next, a concrete example of the present invention is explained below, where the ability of the concrete example to lower the acoustic sensitivity by lowering the response level as explained before is verified. In the present concrete example, the response level and the acoustic sensitivity when the elastic center of the second elastic element 74 is moved from the position E2 to the position E3 as illustrated in FIG. 14 have been measured.

Figure 16:
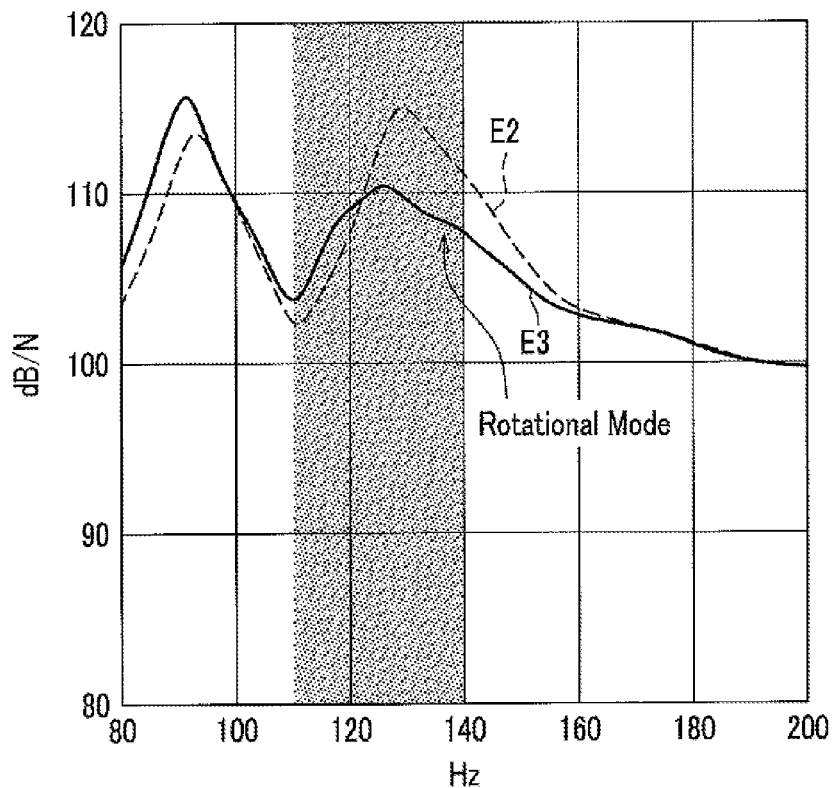
FIG. 16 is a graph presented for verifying an effect of reducing the response level in the subframe structure according to a concrete example of the present invention.
Figure 17:
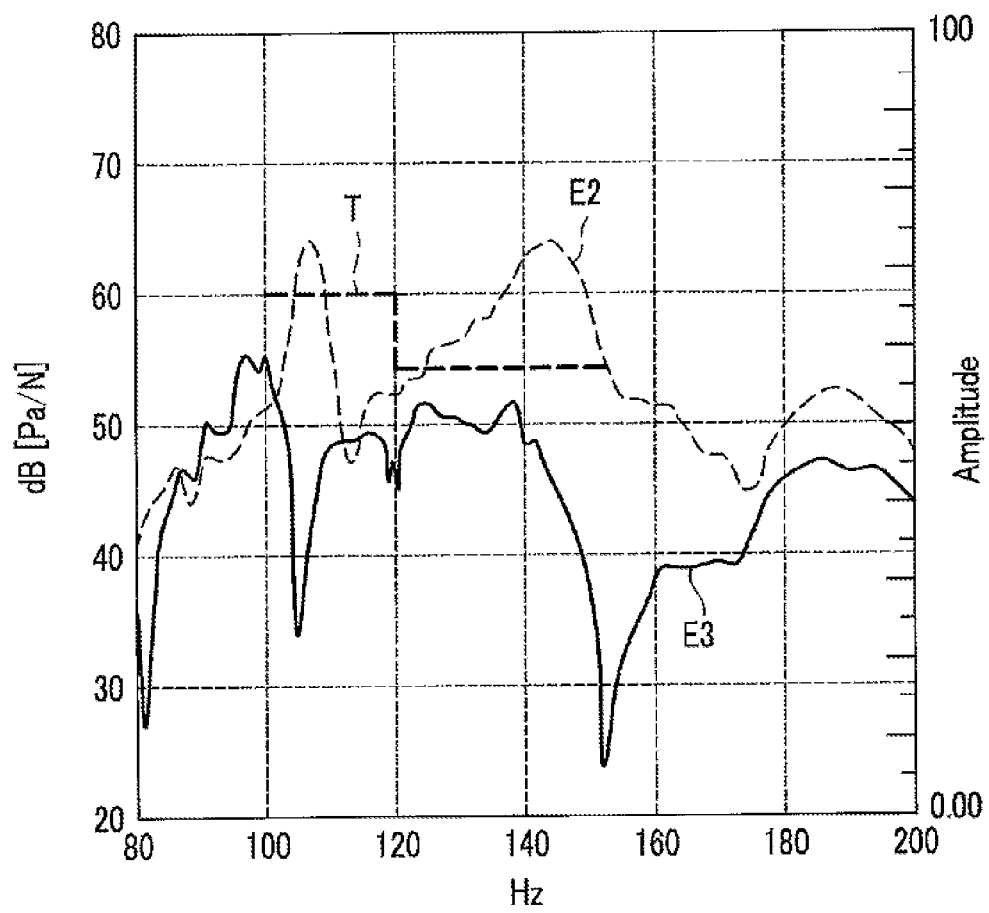
FIG. 17 is a graph presented for verifying an effect of lowering the acoustic sensitivity of the subframe structure according to the concrete example of the present invention.
Figure 18:
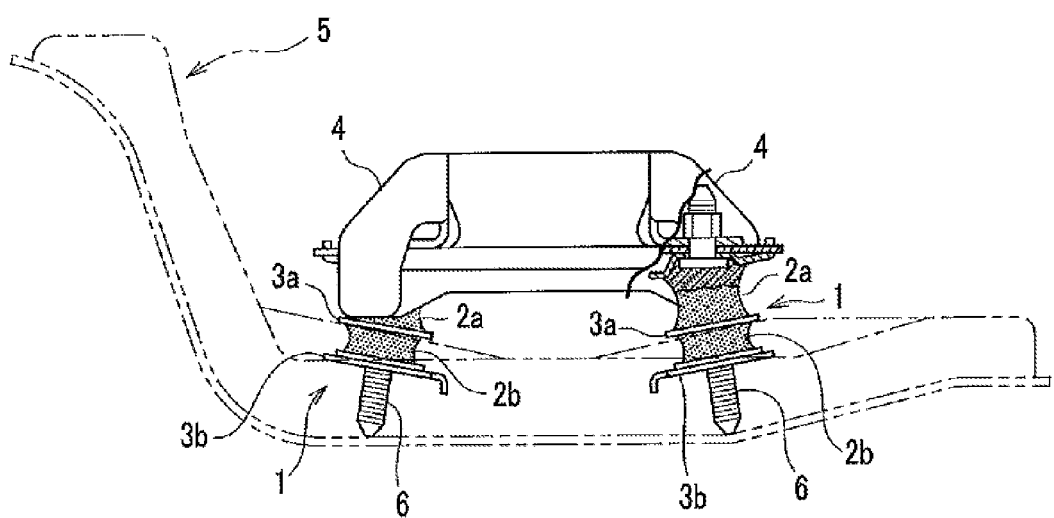
FIG. 18 is a cross-sectional view illustrating a vibration-absorbing elastic structure which is disclosed in Patent Literature 1.

FIG. 16 is a graph presented for verifying the effect of reducing the response level in the concrete example of the present invention, where the abscissa corresponds to the resonant frequency, and the ordinate corresponds to the response level. FIG. 17 is a graph presented for verifying the effect of lowering the acoustic sensitivity of the concrete example of the present invention, where the abscissa corresponds to the resonant frequency, and the ordinate corresponds to the acoustic sensitivity. The dashed curves in FIGS. 16 and 17 respectively indicate the response level and the acoustic sensitivity when a vibration load F is inputted to the input point In in the subframe structure 10 in which the elastic center of the second elastic element 74 is located at the position E2 (illustrated in FIG. 14). In addition, the solid curves in FIGS. 16 and 17 respectively indicate the response level and the acoustic sensitivity when the vibration load F is inputted to the input point In in the subframe structure 10 in which the elastic center of the second elastic element 74 is located at the position E3 (illustrated in FIG. 14).

As illustrated in FIG. 16, it is verified that the response level in the rigid-body resonant frequency range Ar, particularly in the range of 120 Hz to 140 Hz, is more remarkably lowered in the subframe structure 10 in which the elastic center of the second elastic element 74 is located at the position E3 (illustrated in FIG. 14) than in the subframe structure 10 in which the elastic center of the second elastic element 74 is located at the position E2 (illustrated in FIG. 14).

In addition, as illustrated in FIG. 17, it is verified that the acoustic sensitivity in the rigid-body resonant frequency range of 100 Hz to 160 Hz is more remarkably reduced in the subframe structure 10 in which the elastic center of the second elastic element 74 is located at the position E3 (illustrated in FIG. 14) than in the subframe structure 10 in which the elastic center of the second elastic element 74 is located at the position E2 (illustrated in FIG. 14). That is, it is verified that the target sensitivity T can be achieved in the above frequency range.

| List of References | |
|---|---|
| 10: | Subframe Structure |
| 14: | Vehicle-body Frame |
| 14a | Right and Left Front Side Frames |
| 15: | Suspension Lower Arms (Suspension Arms) |
| 16: | Right and Left Side Members (Longitudinal Members) |
| 20: | Front Cross Beam (Lateral Member, Front Lateral Member) |
| 50: | First Bush (Elastic Mechanism) |
| 52: | Second Bush (Elastic Mechanism) |
| 64: | First Elastic Element (Elastic Element) |
| 74: | Second Elastic Element (Elastic Element) |
| 100a: | First Damping Device (Damping Device) |
| P: | Power Plant (Vehicular Power Plant) |

What is claimed is:

1. A subframe structure configured to be supported by a vehicle-body frame and to support a vehicular power plant through damping devices, said subframe structure comprising:
   a longitudinal member which extends in a front-rear direction of a vehicle and is rigidly fixed to the vehicle-body frame;
   a lateral member which extends in a vehicle width direction and on which at least one of the damping devices is mounted;
   a floating mechanism which floatingly supports the lateral member on the longitudinal member through an elastic mechanism, and which cooperates with said at least one of the damping devices such that, during operation, phases of elastic resonant vibrations of the longitudinal member and the lateral member are opposite to each other; and
   a suspension arm connected to the longitudinal member.

2. The subframe structure according to claim 1, wherein the lateral member includes a front lateral member which is floatingly mounted on a front portion of the longitudinal member through the floating mechanism.

* * * * *